United States Patent [19]
Chalmers

[11] 3,991,351
[45] Nov. 9, 1976

[54] BRUSHLESS A.C. SYNCHRONOUS MOTORS
[75] Inventor: Brian John Chalmers, Bramhall, England
[73] Assignee: C.A.V. Limited, Birmingham, England
[22] Filed: Dec. 17, 1974
[21] Appl. No.: 533,525

[30] Foreign Application Priority Data
Dec. 22, 1973 United Kingdom............... 59677/73

[52] U.S. Cl. ............................... 318/186; 318/192
[51] Int. Cl.² ......................................... H02P 1/50
[58] Field of Search .................... 318/186, 190–192

[56] References Cited
UNITED STATES PATENTS

| | | |
|---|---|---|
| 3,093,782 | 6/1963 | Sparrow .............................. 318/186 |
| 3,406,323 | 10/1968 | Jordan ........................... 318/186 X |
| 3,461,368 | 8/1969 | Haller ................................ 318/192 |
| 3,757,182 | 9/1973 | Chalmers et al. .................... 318/186 |

Primary Examiner—Gene Z. Rubinson

[57] ABSTRACT

A brushless A.C. synchronous motor includes a stator assembly having a stator winding and an inverter for feeding the stator winding, a rotor assembly including a field winding and a transformer having a primary winding on the stator assembly and a secondary winding on the rotor assembly. The primary winding is fed by an oscillator on the stator assembly, and the secondary winding provides an output for the field winding by way of rectifier.

10 Claims, 3 Drawing Figures

BRUSHLESS A.C. SYNCHRONOUS MOTORS

This invention relates to brushless a.c. synchronous motors.

A motor according to the invention includes a stator assembly including a stator winding and an inverter for feeding the stator winding, a rotor assembly including a rotor and a field winding on the rotor, and a transformer having a primary winding on the stator assembly, and a secondary winding on the rotor assembly, the primary winding being fed by an oscillator on the stator assembly, and the secondary winding providing an output to the field winding by way of a rectifier on the rotor assembly.

Preferably, the primary winding is wound in slots accommodating the stator winding and the secondary winding is wound on the rotor, the transformer windings being magnetically decoupled from the stator and field windings.

In one arrangement, the transformer has two secondary windings connected through separate rectifiers, which may be connected either in series or parallel to supply the field winding.

The field current can be controlled by altering the frequency of the oscillator.

Figure 1:
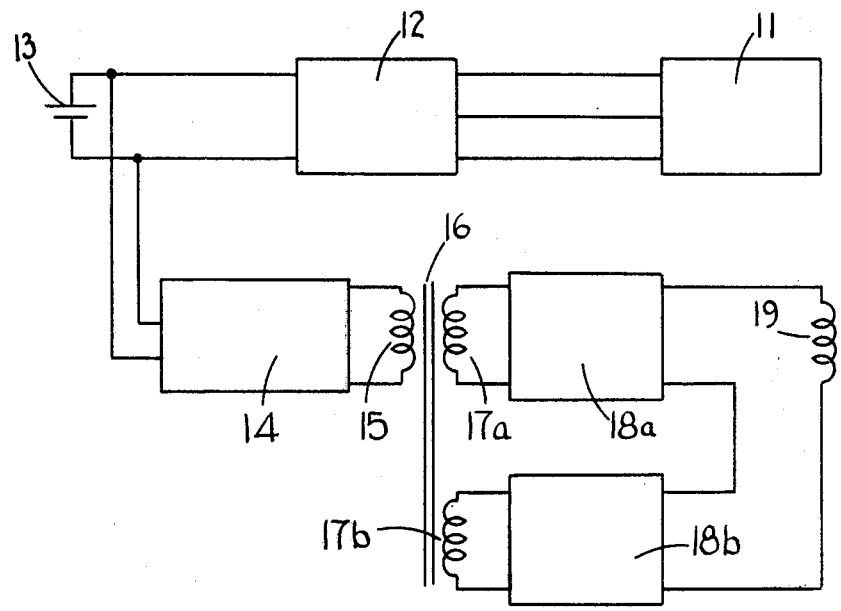
FIG. 1 is a circuit diagram illustrating one example of the invention.

Referring first to FIG. 1, a brushless a.c. synchronous motor includes a stator assembly having a three phase stator winding indicated at 11, this winding being fed through a conventional inverter 12 from a battery 13 or other d.c. source. The motor is intended particularly for use as a drive motor in a vehicle.

The battery 13 also provides power to an oscillator 14 which feeds the primary winding 15 of a transformer 16 having two secondary windings 17a, 17b with their axes electrically 90° apart, the secondary windings of the transformer providing inputs to a pair of rectifiers 18a, 18b which are connected either in parallel, or preferably in series as shown to a field winding 19 on the rotor assembly of the motor. The rectifiers 18a, 18b and secondary windings 17a, 17b are also on the rotor assembly, and the oscillator 14 and primary winding 15 are on the stator assembly. It will be noted that the field current in the winding 19 is independent of the angular position and the rotation of the rotor. This contributes to good starting performance.

Figure 2:
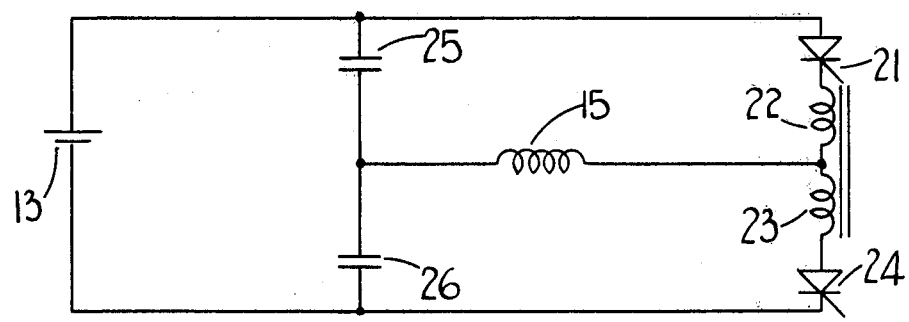
FIG. 2 illustrates one form of oscillator for use in FIG. 1.

The magnitude of the field current can be varied by controlling the frequency of the oscillator 14. A convenient form of oscillator for this purpose is shown in FIG. 2. The battery 13 has connected across it a series circuit including a thyristor 21, a pair of magnetically coupled windings 22, 23 and a thyristor 24. The junction of the windings 22, 23 is connected through the winding 15 to the junction of a pair of capacitors 25, 26 bridging the battery 13. The thyristors 21, 24 are fired in turn, and the capacitors 25, 26 serve to effect the required commutation of the thyristors 21, 24. The frequency of the oscillator is controlled by varying the instant at which gate pulses are applied to the thyristors 21, 24.

Figure 3:
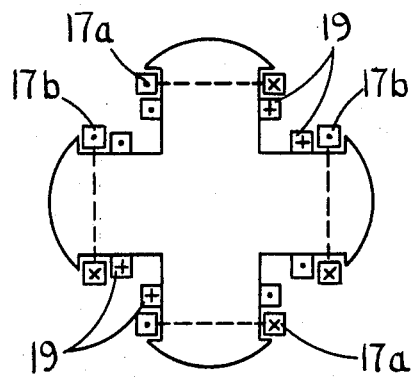
FIG. 3 illustrates one form of winding arrangement.

The transformer 16 could be a self-contained transformer having the primary winding 15 and part of the transformer core on the stator assembly, and the secondary windings 17a, 17b and the remainder of the core on the rotor assembly. However, it is preferred to incorporate the transformer within the motor itself, with the primary winding wound in the same stator slots as the stator winding, and the secondary windings wound on the rotor. Typically, the primary winding would occupy about 10% of the space in the stator slots. It is of course essential in such an arrangement to ensure that the transformer windings are not magnetically coupled to the main machine windings. This can be achieved by arranging that the number of poles produced by the main machine windings is either double or half the number of poles produced by the transformer windings. Using an arrangement as shown, a typical machine would have a three phase stator winding with four poles and a field winding 19 also with four poles, the field winding comprising a single coil on each pole as shown in FIG. 3. The primary winding would be a two pole single phase winding, and the two secondary windings would be wound as shown in FIG. 3.

I claim:

1. A brushless a.c. synchronous motor including a stator assembly including a slotted stator, a stator winding and an inverter for feeding the stator winding, a rotor assembly including a rotor and a field winding on the rotor, and a transformer having a primary winding on the stator assembly, and a secondary winding on the rotor assembly, an oscillator on the stator assembly feeding said primary winding, a rectifier on said rotor assembly, said secondary winding providing an output to the field winding by way of said rectifier, said primary winding of the transformer being wound in slots which also accommodate the stator winding on the secondary winding being wound on the rotor, the transformer windings being magnetically decoupled from the stator and field windings.

2. A motor as claimed in claim 1 in which the magnetic decoupling is achieved by ensuring that the number of poles produced by the main machine windings differs from the number of poles produced by the transformer winding.

3. A motor as claimed in claim 2 in which the number of poles produced by the main machine winding is twice the number of poles produced by the transformer winding.

4. A motor as claimed in claim 2 in which the number of poles produced by the main machine winding is half the number of poles produced by the transformer winding.

5. A motor as claimed in claim 1 in which the transformer has a pair of secondary windings, a pair of rectifiers for rectifying the output obtained at said secondary windings, said rectifiers supplying current to the field winding.

6. A motor as claimed in claim 5 in which the rectifiers are connected in parallel.

7. A motor as claimed in claim 5 in which the rectifiers are connected in series.

8. A motor as claimed in claim 5 in which the secondary windings of the transformer are disposed electrically 90° apart.

9. A motor as claimed in claim 1, in which the frequency of operation of the oscillator is adjustable to control the field current of the motor.

10. A motor as claimed in claim 8 in which the magnetic decoupling is achieved by ensuring that the number of poles produced by the main machine windings differs from the number of poles produced by the transformer windings.

* * * * *